(12) United States Patent
Tandon

(10) Patent No.: US 9,016,480 B2
(45) Date of Patent: Apr. 28, 2015

(54) MULTI-CYCLONE SEDIMENT FILTER

(71) Applicant: Waterco Limited, Rydalmere (AU)

(72) Inventor: Pradeep Kumar Tandon, Rydalmere (AU)

(73) Assignee: Waterco Limited, Sydney (AU)

( * ) Notice: Subject to any disclaimer, the term of this patent is extended or adjusted under 35 U.S.C. 154(b) by 307 days.

(21) Appl. No.: 13/736,792

(22) Filed: Jan. 8, 2013

(65) Prior Publication Data

US 2013/0118960 A1  May 16, 2013

Related U.S. Application Data

(63) Continuation-in-part of application No. 12/665,299, filed on May 3, 2010, now Pat. No. 8,348,064.

(51) Int. Cl.
*B01D 21/26* (2006.01)
*B04C 5/28* (2006.01)

(52) U.S. Cl.
CPC .............. *B01D 21/267* (2013.01); *B04C 5/28* (2013.01)

(58) Field of Classification Search
USPC .............. 210/512.2; 209/711, 712, 728, 729; 55/459.1
See application file for complete search history.

(56) References Cited

U.S. PATENT DOCUMENTS

| | | |
|---|---|---|
| 2,671,560 A | 3/1954 | Fontein et al. |
| 2,734,630 A | 2/1956 | Van Der Wal |
| 4,726,902 A | 2/1988 | Hubbard |
| 4,793,925 A | 12/1988 | Duval et al. |
| 4,823,731 A | 4/1989 | Howeth |
| 5,879,545 A | 3/1999 | Antoun |
| 6,485,536 B1 | 11/2002 | Masters |
| 7,306,730 B2 | 12/2007 | Tashiro et al. |
| 8,348,064 B2 * | 1/2013 | Tandon ...................... 210/512.2 |
| 2004/0149667 A1 | 8/2004 | Meyer |
| 2006/0230725 A1 | 10/2006 | Han |

FOREIGN PATENT DOCUMENTS

| | | |
|---|---|---|
| FR | 2619498 | 2/1989 |
| GB | 667142 | 2/1952 |
| GB | 1090978 | 11/1967 |

* cited by examiner

*Primary Examiner* — David A Reifsnyder
(74) *Attorney, Agent, or Firm* — Craig M. Stainbrook; Stainbrook & Stainbrook, LLP

(57) ABSTRACT

A multi-cyclone sediment filter having a housing with upper and lower shells and defining an interior space for fluid flow. A cyclone holder is disposed in the housing and includes a plurality of fluid cyclones, each comprising a conical tube with a small opening at a lower end and a larger opening at an upper end. A fluid inlet introduces fluid into the filter housing. A fluid outlet in fluid discharges fluid. A manifold plate is disposed above the cyclone holder and includes a plurality of diffuser tubes, each extending downwardly into an upper end of one of the fluid cyclones. Fluid flowing from the fluid inlet is directed into a diverter cone under the manifold plate and is diverted outwardly between the manifold plate and the cyclone holder, into the fluid cyclones, outwardly through the diffuser tubes, and then out through the fluid outlet.

20 Claims, 8 Drawing Sheets

MULTI-CYCLONE SEDIMENT FILTER

CROSS-REFERENCE TO RELATED APPLICATIONS

The present application is a continuation-in-part of U.S. patent application Ser. No. 12/665,299, now U.S. Pat. No. 8,348,064, issued Jan. 8, 2013 (Jan. 8, 2013), which was a U.S. National Stage application filed under 35 U.S.C. §371, based on International Application Number PCT/IB2008/001633, filed Jun. 20, 2008, and which claimed priority to U.S. Provisional Patent Application Ser. No. 60/945,185, filed Jun. 20, 2007 (Jun. 20, 2007).

BACKGROUND OF THE INVENTION

1. Technical Field

The present invention relates generally to cyclonic separators, more particularly to a multi cyclone separator and sediment filter for fluids, utilizing a plurality of cyclone apparatus arranged in a radial pattern to remove particulate debris from the fluid.

2. Background Discussion

Cyclonic separators are used for separating unwanted debris from fluids by using centrifugal force. The fluid is typically injected obliquely into the cyclonic separator elements such that a circular flow is set up. The centrifugal forces act on the debris, which is more dense than the fluid in which it is suspended, forcing the denser material outwardly and toward the perimeter of the separation chamber. The conical shape of the separator elements does not allow the denser material to exit the top of the inverted cone. Instead, the substantially debris-free fluid surrounding the center of the vortex is extracted and re-circulated, while the debris is collected and discarded.

Some cyclonic filters are used in a component system in combination with a separate filter housing and a separate sludge receiver housing. These component systems require regular cleaning and changing of several housings and filter bags. This increases apparatus down time and the amount of inventory needed to maintain the system in working order.

Cyclonic separation is commonly used in vacuum cleaners to remove fine and large debris from an air stream created by the vacuum. Air is injected tangentially into the cyclonic chamber and the resultant vortex spins and forces debris to the walls of the cyclonic chamber, while clean air exits the top of the vortex.

Cyclonic technology is also used in water treatment in oil production. Standard oilfield-produced water equipment includes, as examples, skim tanks, corrugated plate interceptor vessels, Wemco units, centrifuges and hydrocyclones. It has been recognized that all of these elements are all susceptible to changes in operational parameters. Units are designed for a certain flow rate, operating pressure, solids loading, and oil loading. Under the predefined parameters is able to treat produced waters effectively. Typically, however, the parameters do not remain constant. CETCO Offshore has designed the CRUDESEP® unit for the removal of oil, gas and solids, for example, either upstream or downstream of a three-phase separator. The principle of the CRUDESEP® is a vertical vessel operating at near-atmospheric pressure. [CRUDESEP is a registered trademark of AMCOL International Corporation of Arlington Heights, Ill.] Gravity oil separation is enhanced by induced gas flotation and swirling flow, where gas bubbles are injected midway up the vessel using eductors. Produced water is withdrawn from the system in the lower half of the unit and used to drive the eductors, the gas being taken from the top of the vessel. This is intended to eliminate cumbersome moving parts with swirling flow achieved by a series of tangential feed nozzles at the wall.

Other background systems are documented in several patents, including U.S. Pat. No. 4,726,902 to Hubbard, which teaches a cyclone degritter that receives water inflow and directs the water through cyclone units with an underflow directed to a grit pot and an overflow of substantially purified water.

U.S. Pat. No. 7,306,730 Tashiro et al, describes a cyclone-type separator for separating solid particles from liquid. The apparatus comprises a hollow cylindrical body with inlet and discharge ports. The main body causes liquid to swirl or eddy in the main body, and the foreign matter contained in the liquid is separated by centrifugal force as the liquid swirls. The foreign matter falls along an inner surface of the main body and is discharged through the discharge port. Clean liquid is discharged from the discharge port. Tashiro et al show the introduction of fluid into the side of a single cyclone.

U.S. Pat. No. 4,793,925 to Duval et shows a single element separator which includes a body with an inlet and outlet that induces a vortex in fluid by driving it into an inverted conical chamber. Solid particulate materials fall out of a port in the bottom of the cone. In many respects, this is difficult to distinguish over Tashiro et al.

U.S. Pat. Appl. Ser. No. 2004/0149667 by Meyer show another version of kind of apparatus taught by Tashiro et al and Duval et al.

U.S. Pat. Appl. Ser. No. 2006/0283788 by Schreppel, Jr., teaches a three stage separator in which swirl chambers and aeration produces bubble formation and collapse that creates localized high pressure. In a first stage the liquid passes through a swirl chamber and rotating flow is dispersed to oxide and mix it. The swirl chamber includes a spiral passageway for the centrifugal flow of the influent material to be dispersed outwardly from the chamber. The swirl chamber typically includes a top cover and a bottom cover substantially closing the cylinder except for a central opening in the top cover for release of lighter materials and a central opening in the bottom cover for the heavy contaminants.

Other patents of interest include U.S. Pat. No. 4,823,731 to Howeth, which describes an electrostatic dry powder coating spraying device having a multi-color powder coating recovery system with a plurality of vertically extending cyclonic filter barrels laterally spaced about a central vertical axis and having vertically aligned upper ends. A single filter cleaning apparatus, including a filter back flushing system, is adapted to rest upon and operatively engage any selected one of such upper barrel ends, and is operative to back flush the filter within the barrel upon which it rests. Oversprayed powder from the spraying system is reclaimed by drawing it through the "active" filter barrel to which the filter cleaning apparatus is connected.

U.S. Pat. No. 5,879,545, to Antoun, describes a compact cyclonic filter assembly used for separating unwanted debris from a fluid. The cyclonic filter assembly uses the centrifugal forces to separate large pieces of debris from the fluid and a filter to separate the remaining unwanted debris from the fluid. The invention can be contained in a compact single housing which may be disassembled for easy cleaning and replacement of parts. The cyclonic filter assembly has a vertically oriented cylindrical tube which receives a tangential injection of the debris laden fluid. The tangential injection causes the fluid to circulate around a cylindrical vortex finder which is inside of and coaxial with the tube. The centrifugal forces acting on the debris causes the debris to move outward away from the center of the vortex. The vortex finder has an opening which pulls in the relatively clean fluid near the center of the vortex while the debris laden fluid settles into a collection chamber below the cylindrical tube. The invention has a filtration chamber housing a filter element which is used to extract the remaining unwanted debris from the fluid before it exits the cyclonic filter assembly.

U.S. Pat. No. 6,485,536 to Masters describes a particle separator which separates entrained particulates from a fluid. The particle separator utilizes an auger enclosed within a cylinder to form a cyclonic chamber, through which air is propelled. The centrifugal motion of particles within the air causes the particles to exit the cyclonic chamber through ducts, and the particles are separated in collection chambers.

Currently, there is a need for a compact cyclonic separation assembly for the treatment of swimming pool water, waste water, and oil. The desired system should employ centrifugal force to separate debris from a debris laden fluid. Importantly, the filter assembly should be capable of easy disassembly for cleaning and parts replacement, making the separator assembly inexpensive to maintain. It should also be capable of handling high fluid flow rates and rapid fluid processing and should provide significant pre-filtration prior to flow through sand filter elements, thereby eliminating the need for frequent back flushing of the sand filters and saving thousands of gallons of water.

The prior art documents discussed above reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The present invention is a multi-cyclone sediment filter (separator) that includes a sediment bowl with a hemispherical bottom and a sump therein for collecting sediment, a cylindrical cyclone housing disposed above and sealingly connected to the sediment bowl, a removable and replaceable cyclone cartridge inserted into the cyclone housing, a diffuser plate sealingly connected to the cyclone cartridge and cyclone housing, a fluid inlet for introducing fluid into the cyclone housing, and a fluid outlet for discharging fluid from the cyclone housing. The cyclone cartridge inserted in the cyclone housing includes a plurality of vertically disposed inverted cone-shaped fluid cyclones, each having a small opening at a lower end and larger opening at an upper end. The cartridge has a plurality of fluid flow paths that direct fluid to the cyclones where a vortex is induced in the moving fluid. As sediment is removed from the fluid in each cyclone, it is separated out and delivered down into the sediment bowl sump, while fluid is directed upwardly and out to the fluid outlet.

It is an object of the present invention to provide a new and improved multi-cyclone sediment filter that provides effective filtering for small or large applications for filtering swimming pool water, waste water, and oil.

It is another object of the present invention to provide a new and improved sediment filter that is easily repaired, maintained, cleaned, and serviced.

A further object or feature of the present invention is a new and improved filter apparatus well adapted for pre-filtering for in-place sand filters.

An even further object of the present invention is to provide a novel multi-cyclone sediment filter that includes a plurality of radially disposed cyclonic cones that allows for high fluid flows and rapid fluid processing.

Still another object of the present invention is to provide a multi-cyclone separator that eliminates the need for frequent back flushing of swimming pool sand filters, thus saving thousands of gallons of water.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE DRAWINGS

The invention will be better understood and objects other than those set forth above will become apparent when consideration is given to the following detailed description thereof. Such description makes reference to the annexed drawings wherein.

Drawing Reference Numerals

FIGS. 1-3

Figure 1:
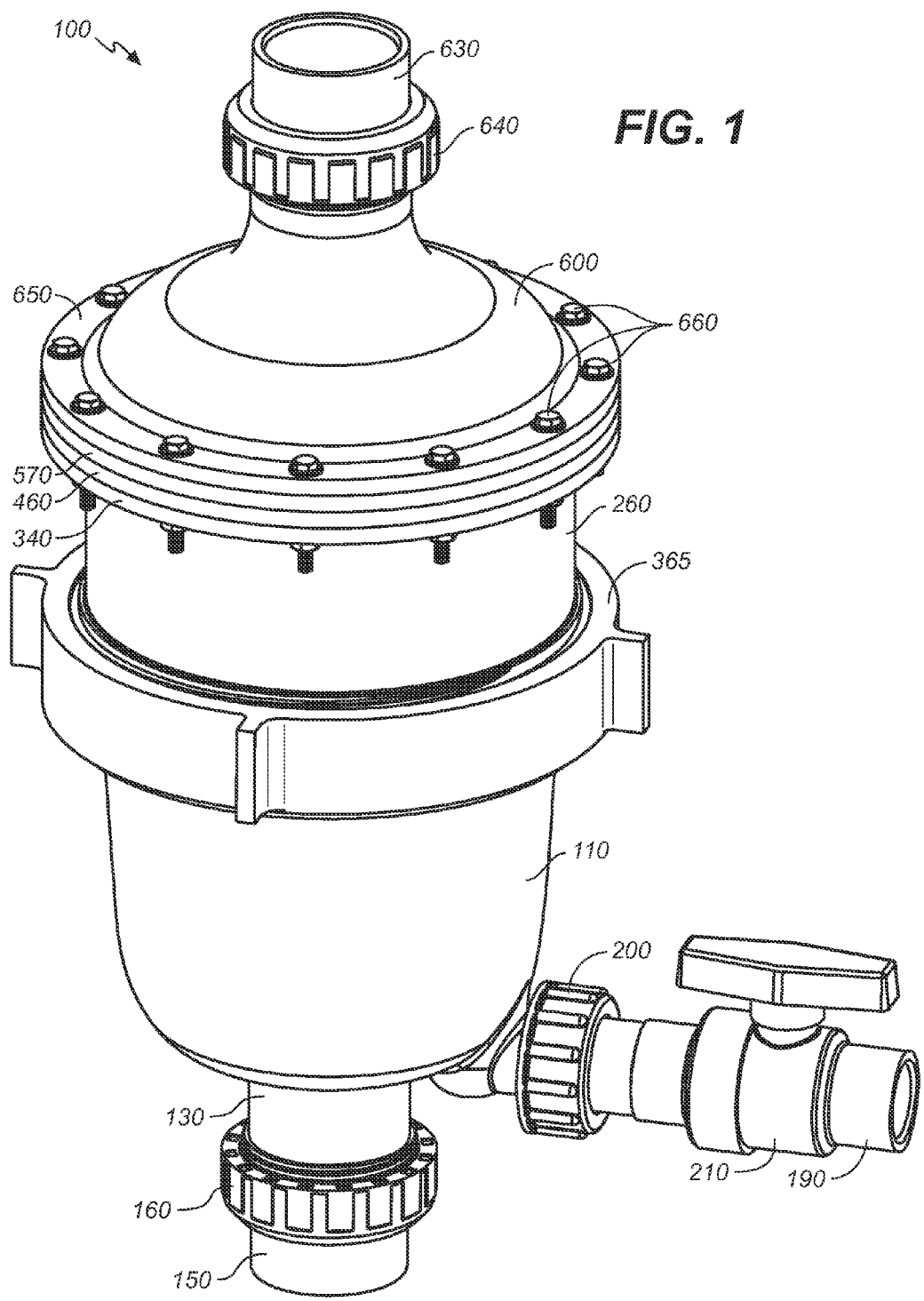
FIG. 1 is an upper left front perspective view of a first preferred embodiment of the assembled multi-cyclone sediment filter (separator) of the present invention.

100 inventive multi-cyclone sediment filter (generally)
110 sediment bowl
120 bottom portion of sediment bowl
130 fluid inlet
A central axis
140 threaded male end of fluid inlet tube
150 fluid source tube
160 locking collar
170 sediment bowl drain tube
180 threaded male end of sediment bowl drain tube
190 drain outlet pipe
200 locking collar
210 purge valve
220 particle bed 230 holes in particle bed
240 stand-offs
250 flange
260 cyclone housing
270 male threads
280 deck
290 sediment holes
300 fluid conduit
310 underside of deck
320 top side of deck
330 sealing ring
340 flange
350 annular groove
360 O-ring seal
365 locking collar
370 cyclone cartridge
380 fluid cyclones
390 cyclone cartridge inlet tube
400 flared upper end of cyclone cartridge inlet tube
410 vortex openings
420 vortex channels
430 vortex ports
440 O-ring seal
450 annular groove
460 flange
470 O-ring
480 annular groove
490 annular groove
500 O-ring seal
510 diffuser (manifold) plate
520 vortex (diffuser) tubes
530 through holes
540 space above diffuser plate
550 center hole
560 diverter cone
570 outer (flange) portion
580 annular groove
590 O-ring seal
600 cap
610 cap neck
620 threaded male end of neck
630 fluid outlet pipe
640 locking ring
650 flange
660 bolts
670 air relief valve
680 valve port Drawing Reference Numerals

FIGS. 5-7

700 second preferred embodiment
710 lower shell
720 bottom portion of lower shell
730 drainage area in lower shell
740 drain outlet pipe
750 two-way purge valve
760 fluid inlet
770 pipe fittings
780 sight glass
790 flange/rim
800 bend
810 central portion of cyclone holder
820 cyclone holder
830 fluid cyclones
840 outer rim 850 channel
860 O-ring
870 channel
880 O-ring
890 inlet opening
900 diverter cone
910 underside of manifold plate
920 manifold plate
930 holes in manifold plate
940 diffuser tubes
950 upper shell
960 fluid outlet
970 pipe fittings
980 fluid outlet pipe
990 flange portion
1000 pressure relief valve
1010 pressure gauge
1020 upper (vortex) openings in fluid cyclones
1030 base

BEST MODE FOR CARRYING OUT THE INVENTION

Figure 2A:
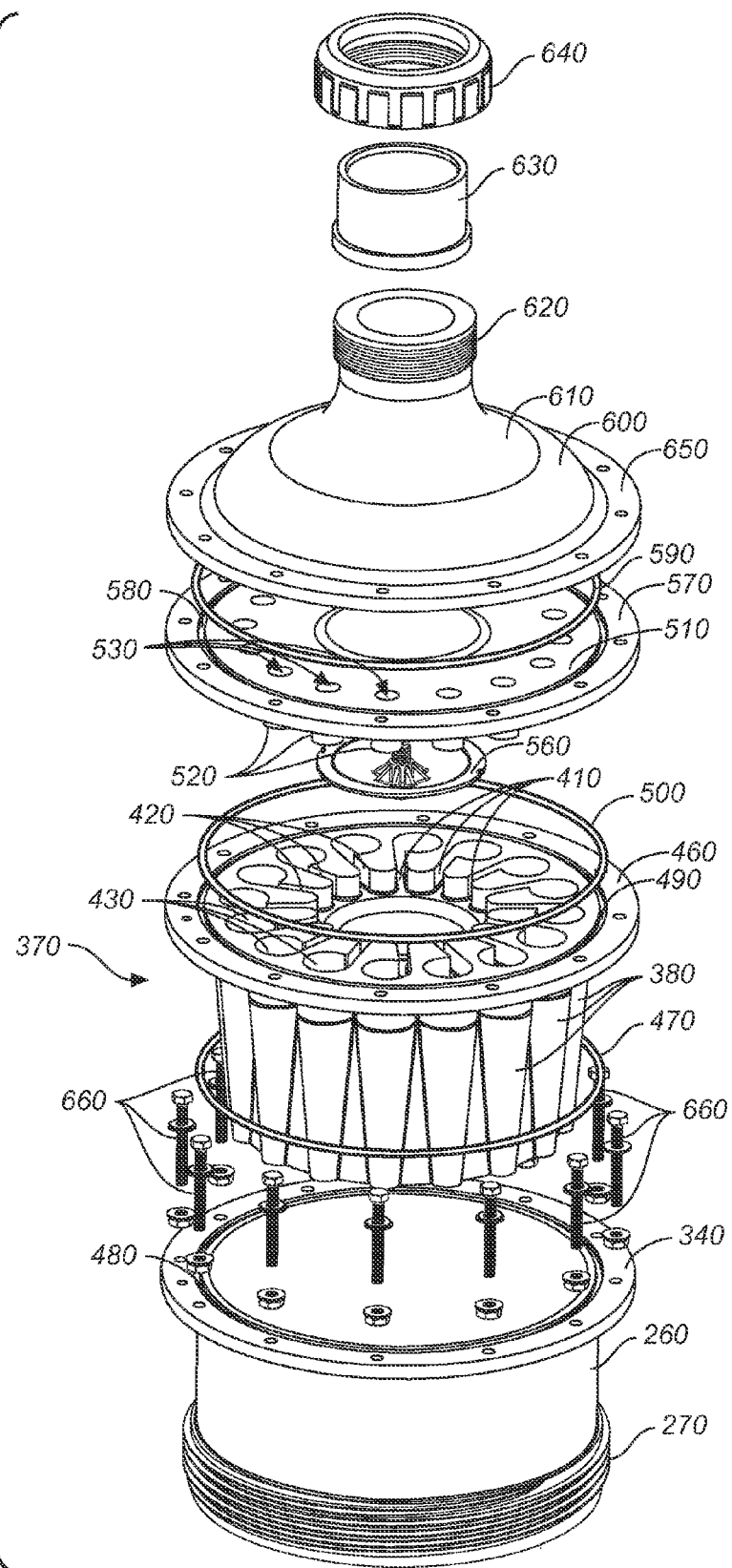
FIG. 2A is an exploded perspective view of the upper portion of the multi-cyclone separator.
Figure 2B:
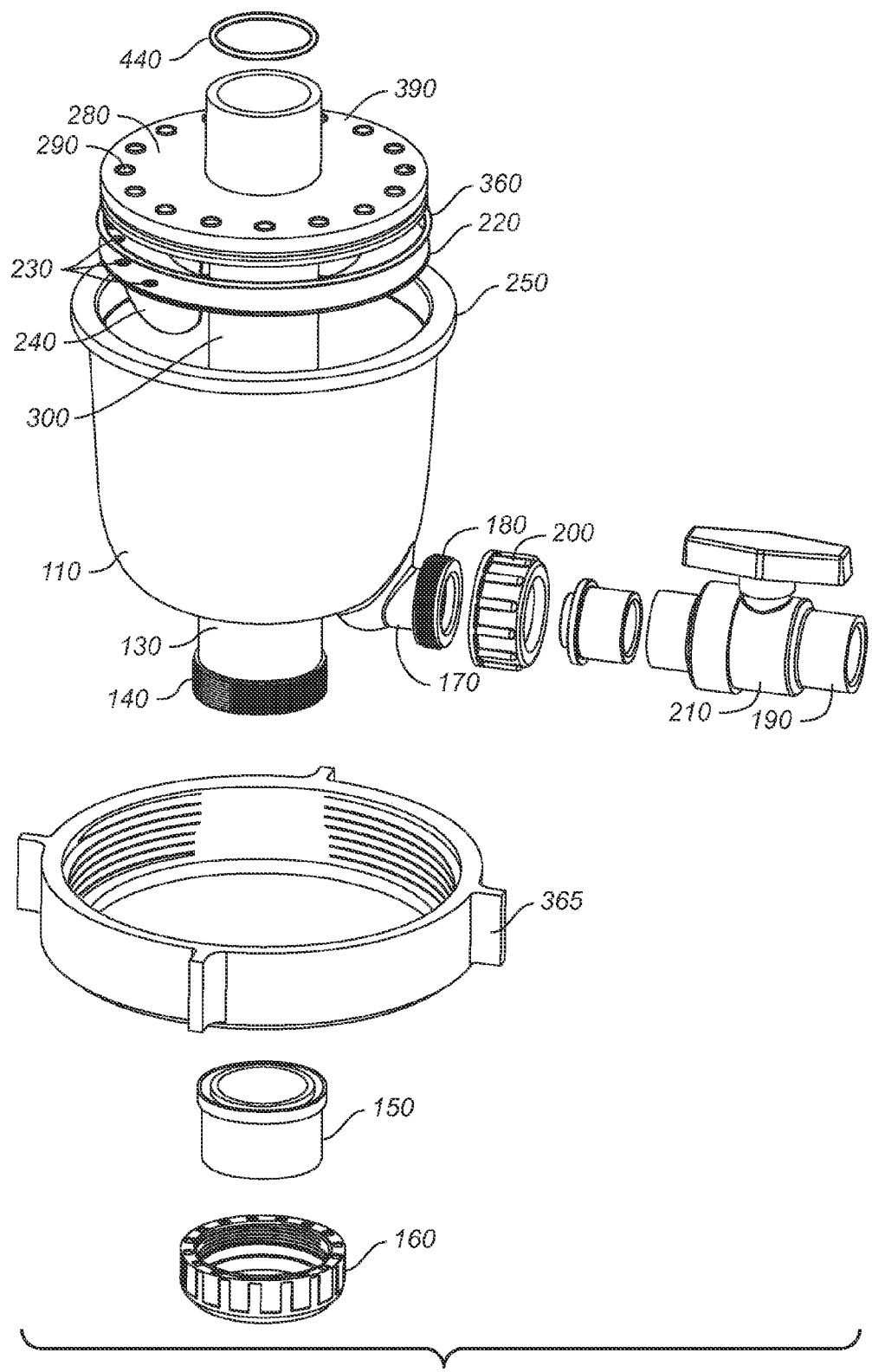
FIG. 2B is an exploded perspective view showing the lower portion of the inventive apparatus.
Figure 3:
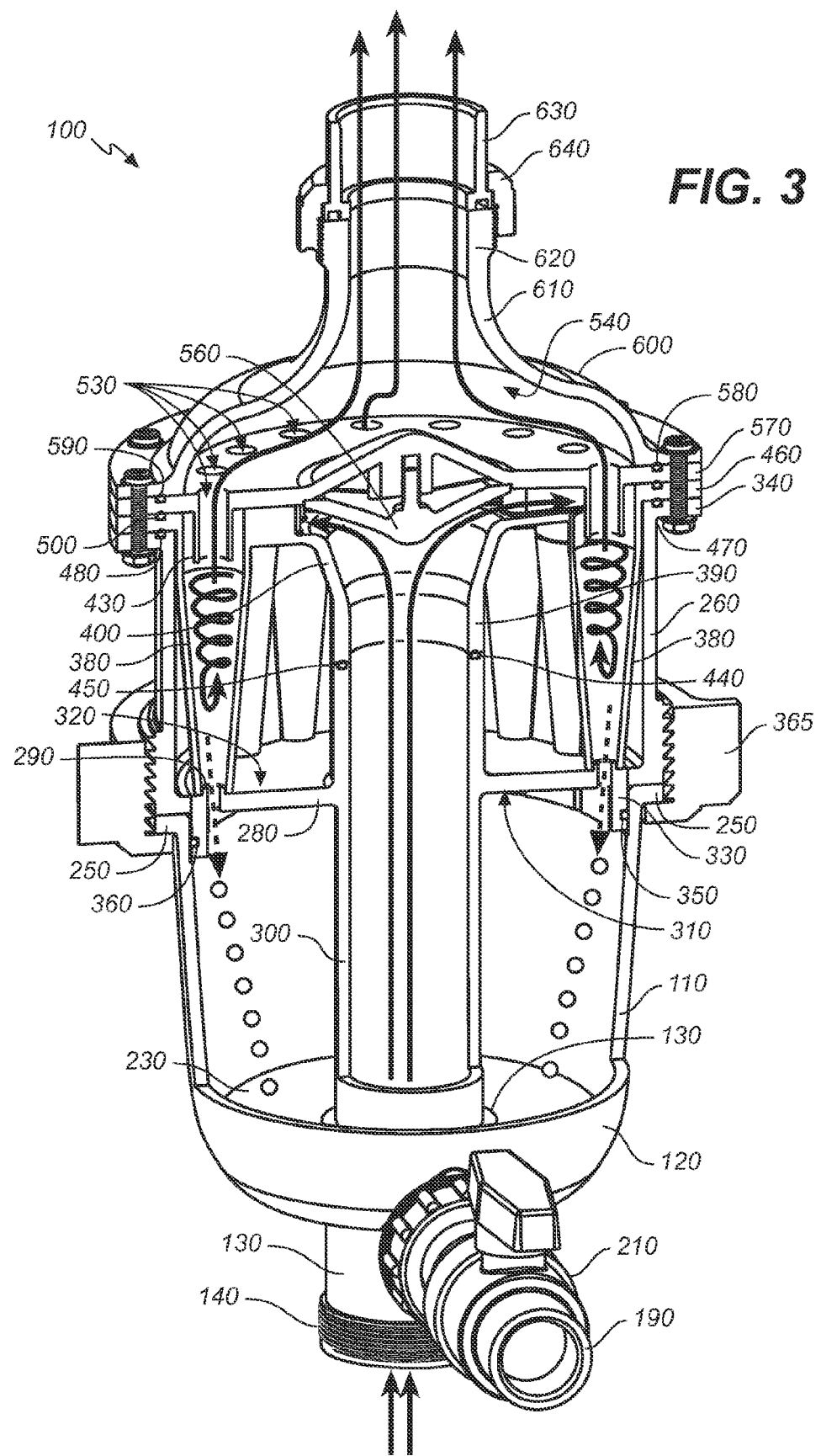
FIG. 3 is a cross-sectional perspective view of the inventive multi-cyclone separator showing the fluid flow paths.

Referring to FIGS. 1 through 3, wherein like reference numerals refer to like components in the various views, there is illustrated therein a new and improved multi-cyclone separator or sediment filter, generally denominated 100 herein. Collectively these views show that, in a first preferred embodiment, the inventive apparatus comprises a lower sediment bowl 110 having a hemispherical bottom portion, or sump, 120, with a fluid inlet 130, preferably a tube axially disposed on the central axis A through the bottom. The fluid inlet includes a threaded male end 140 which is connected to a pressurized fluid source through a fluid source tube 150 via a locking collar 160 having female threads complementary to the male end of the fluid inlet tube.

Extending radially from the bottom portion of the sediment bowl is a sediment bowl drain tube 170 having a threaded male end 180 for connection to a drain outlet pipe 190 via a locking collar 200. The drain outlet pipe preferably includes a purge valve 210 for selective draining of the sediment bowl.

A generally planar and annular particle bed 220 is placed at the bottom of the sediment bowl and includes a plurality of holes 230 that allow the finest sediment to settle into the bottom of the sediment bowl while restricting passage of larger particulate material. The particle bed is stabilized by one or more stand-offs 240 disposed on the underside of the particle bed.

The upper edge of the sediment bowl includes an outwardly extending flange or rim 250.

The second major element in the inventive apparatus is a cylindrical cyclone housing 260 having male threads 270 on its exterior lower end 270, floor or deck 280 having a plurality of sediment holes 290, an integrally formed fluid conduit 300 extending downwardly from the underside 310 of the deck and upwardly from the top side 320 of the deck, a sealing ring 330 integral with the underside of the deck and sized with an exterior circumferential diameter to fit tightly against the interior side of the upper portion of the sediment bowl, and a flange 340 extending outwardly from its upper edge. The sealing ring includes an exterior annular groove 350 in which an O-ring seal 360 is disposed.

The sediment bowl and cyclone housing are connected by inserting the sealing ring 330 into the upper portion of the sediment bowl so that the outermost portion of the underside of the deck 310 is seated upon the flange or rim 250 of the sediment bowl. A threaded locking collar 365 is then screwed onto the exposed male threads of the cyclone housing. When this is done, the fluid conduit 300 is brought into fluid communication with, and into a tight sealed engagement with, the fluid inlet 130.

The multi-cyclone separator next includes a cyclone cartridge or magazine 370, a complex element comprising a plurality of vertically disposed inverted conical fluid cyclones 380 having open upper and lower ends, the latter having the smaller openings. The central portion of the cyclone cartridge includes a cyclone cartridge inlet tube 390 brought into axial alignment with the fluid conduit 300 in the assembled apparatus. The cyclone cartridge inlet tube 390 includes a flared upper end 400 that encourages water under pressure and high velocity to move to a plurality of vortex openings 410 and through vortex channels 420 which extend to circular vortex ports 430 in fluid communication with the open upper ends of the inverted conical fluid cyclones 380. An O-ring seal 440 is disposed in an annular groove 450 in the upper end of the fluid conduit to complete the seal with the cyclone cartridge inlet tube.

The upper edge of the cyclone cartridge includes an outwardly extending flange 460 that is seated upon the flange 340 of the cyclone housing 260, and a seal is formed by an O-ring 470 disposed in an annular groove 480 in the upper surface of flange 340. The flange 460 of the cyclone cartridge also includes an annular groove 490 into which an O-ring seal 500 is placed.

The sediment filter and multi-cyclone separator of the present invention next includes a generally planar diffuser plate, or manifold plate, 510, having a plurality of diffuser tubes (vortex tubes) 520 extending downwardly from its underside, each tube inserted into the upper portion of the conical cyclones, the diffuser tubes having an outer diameter less than that of the upper diameter of the open upper end of the cyclones. Through holes 530 penetrating the diffuser plate bring the diffuser tubes and the cyclones into fluid communication with the space 540 above the diffuser plate. A center hole 550 in the diffuser plate accommodates a diverter cone 560 which directs fluid flowing over it up and away from the diffuser plate. When the diffuser plate is placed over the cyclone cartridge, it creates a ceiling over the cyclone cartridge and restricts fluid flow paths through the cyclone cartridge, cooperating with the cyclone cartridge structure to create a manifold. The resultant structure limits the available flow path from the cartridge fluid inlet through cyclone cartridge to that of the many vortex openings 410, the vortex channels 420, and the vortex ports 430 to the fluid cyclones 380, where sediment separation takes place during system operation.

The outer (flange) portion 570 of the diffuser plate has a circumference substantially the same as that of the cyclone housing flange 340 and the cyclone cartridge flange 460, such that on assembly it is seated atop the cyclone cartridge flange. It, too, includes an annular groove 580 for an O-ring seal 590.

Figure 4:
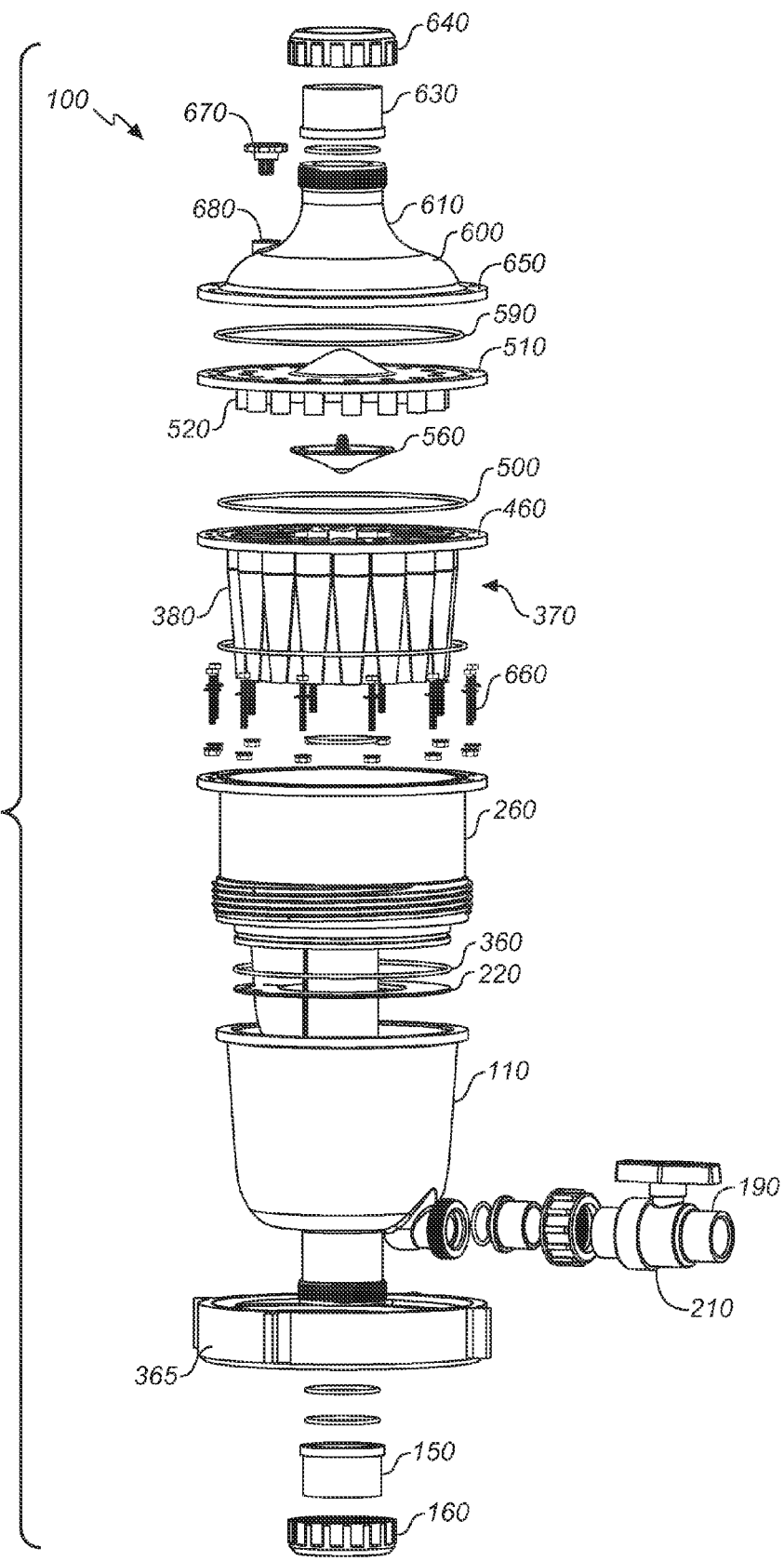
FIG. 4 is an exploded upper front perspective view showing the first preferred embodiment shown in FIGS. 1-3.

Next, disposed atop the diffuser plate is a dome-shaped cap 600 having an axially disposed neck 610 that extends to a threaded male end 620 adapted for attachment to a fluid outlet pipe 630 through a locking ring 640. As with the elements disposed below the cap, the cap includes a flange portion or circumferential ring 650 that is dimensionally substantially identical to the inferior flange portions. Therefore, and as will be immediately appreciated by reference to the drawings, the multi-cyclone housing, the cyclone cartridge, the diffuser plate 510, and the cap 600 are secured to one another by bolts 660 that pass through aligned apertures in each of the flange portions of the elements, in a manner well known in the art. Additionally, it is the dome shaped cap 600 that creates the open space 540 through which fluid flows after leaving the fluid cyclones in the cyclone cartridge and before exiting the filter through the fluid outlet 630. To prevent damage from excessive pressure, an air relief valve 670 may be installed in a relief valve port 680 disposed the cap 600 (FIG. 4 only).

As may be appreciated, deck 280 may be provided as an independent piece or formed integrally with fluid conduit 300 or formed integrally with cyclone cartridge 370, according to both manufacturing and maintenance preferences. The most elementary design has deck 280 formed integrally with fluid conduit 300, in which event is includes, also as an integral element, sealing ring 330. Thus, in assembly, the cyclone housing is threadably attached to the sediment bowl, after which fluid conduit 300 is firmly inserted into the fluid inlet 130, after which the cyclone cartridge is inserted into the cyclone housing and coupled to the fluid conduit, after which the diffuser plate and cap are placed and the layered flanges bolted together.

Referring now to FIG. 3, arrows show the flow path of fluid into, through, and out from the multi-cyclone separator of the present invention. Fluid is introduced through the fluid inlet tube 130 from a pressurized source, such as a pump. The water continues up the fluid conduit 300 and then into and through the cyclone cartridge inlet tube 400. As it reaches the flared upper portion of the cyclone cartridge inlet tube, the fluid flows outwardly, where it is further diverted by engagement with the structural elements of the cyclone cartridge 370, which creates restricted flow paths sending the fluid through the vortex inlets 410, vortex channels 420, and vortex ports 430, where the fluid is then directed into the sides of the open upper ends of the cyclones 380 and around the vortex tubes 520 partially extending into the cyclones. With this fluid path, fluid under constant pressure and continuous flow induces a fluid vortex in the cyclones. The vortex spins heavy sediment particles outwardly through centrifugal force, which then drop downwardly under the influence of gravity to the bottom of the cyclone and through the bottom openings in the cyclones. The difference in size between the available outlets in the cyclones creates a pressure differential from top to bottom, and in contrast to heavy particles, the fluid proceeds upwardly through the diffuser plate holes 530 and finally out the fluid outlet 630. The sediment continues to fall where and eventually collects in the sump at the bottom portion of the sediment bowl.

The present invention reduces backwashing, extends filter cartridge life, obviates the need to clean or replace filter media, and is extremely simple to clean. The present invention requires little or no maintenance, as there are no moving parts to fail or wear out, or filter media to clean or replace. The accumulation of sediment can be visibly monitored through a transparent sediment sump. The sediment is simply discharged by opening the purge valve. Only a small amount of water is discharged to purge the filter of sediment. Thus, the multi-cyclone is perfectly suited for pre-filtration to extend the filtration cycle of an existing filter. In trials, it was shown that the multi cyclone will filter approximately 75% of the incoming sediment from a typical residential swimming pool.

Most importantly, in a first preferred embodiment of the inventive apparatus provides a way for rapid parts replacement and maintenance, particularly with respect to the cyclone cartridge or magazine 370, the signal element in this embodiment of the system. This is accomplished by disconnecting the fluid outlet and then removing the bolts 650 securing the filter elements in a stacked sandwich configuration. The cyclone cartridge can simply be lifted out from the cyclone housing 260 and replaced with a new cyclone magazine while the removed cartridge can be cleaned, reconditioned, or simply discarded.

Figure 5:
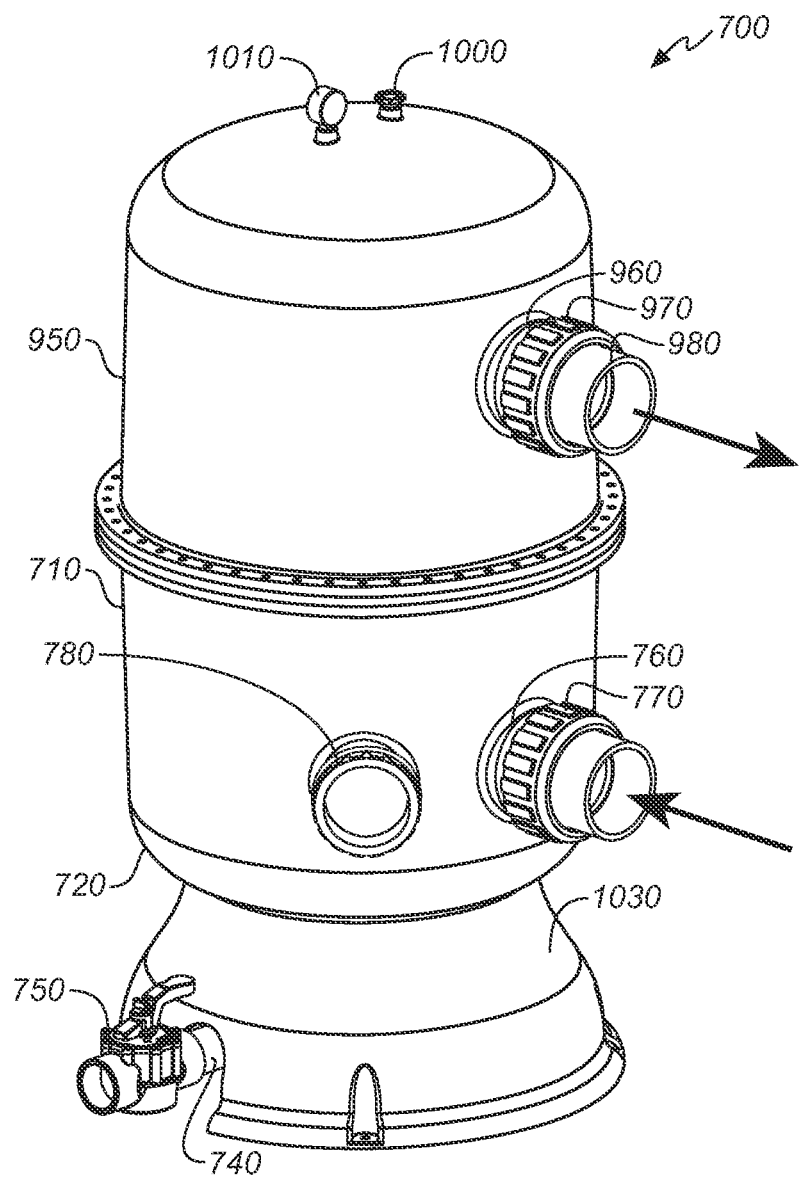
FIG. 5 is an upper left front perspective view of a second preferred embodiment of the multi-cyclone sediment filter.
Figure 6:
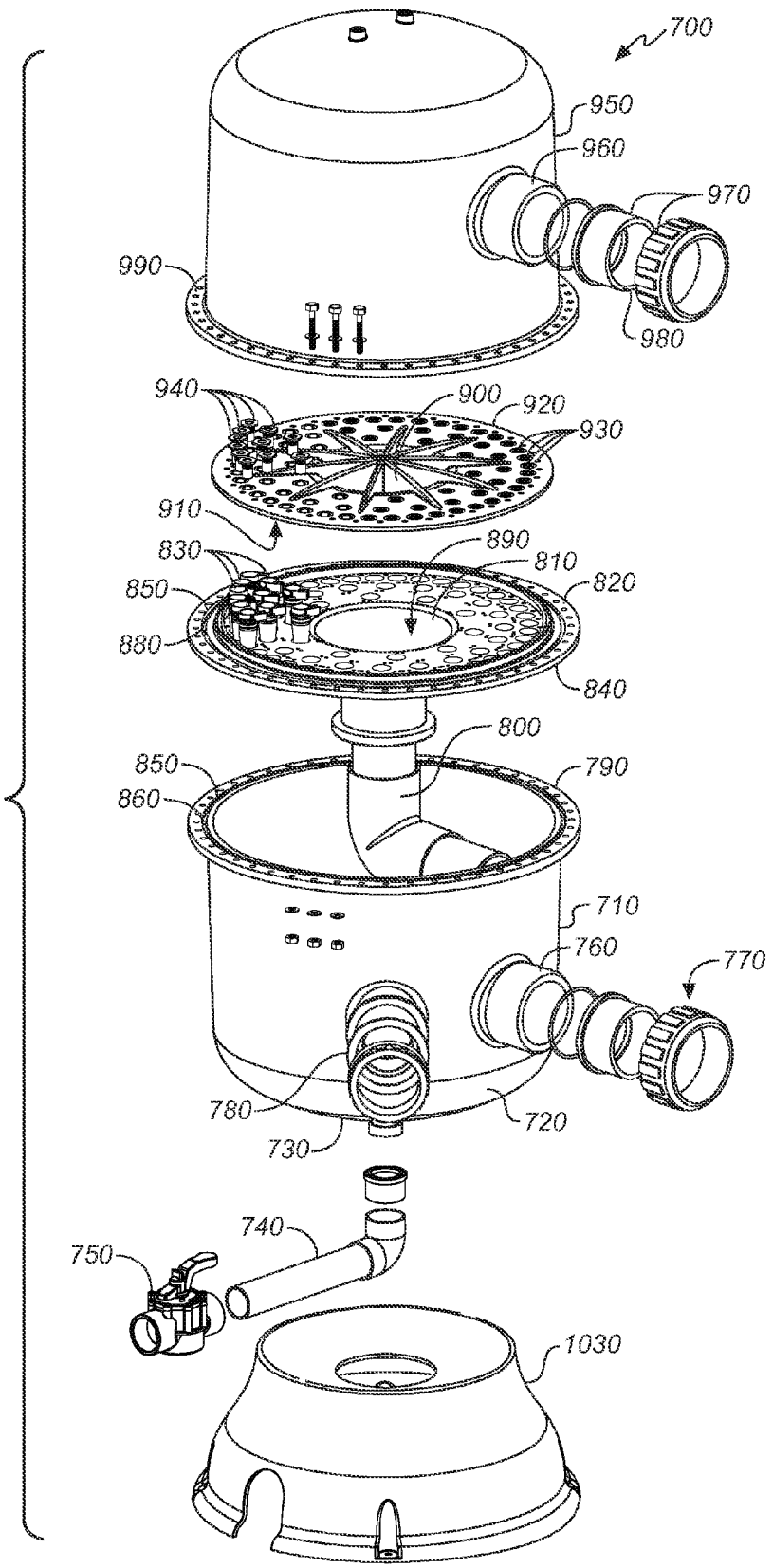
FIG. 6 is an exploded view thereof.
Figure 7:
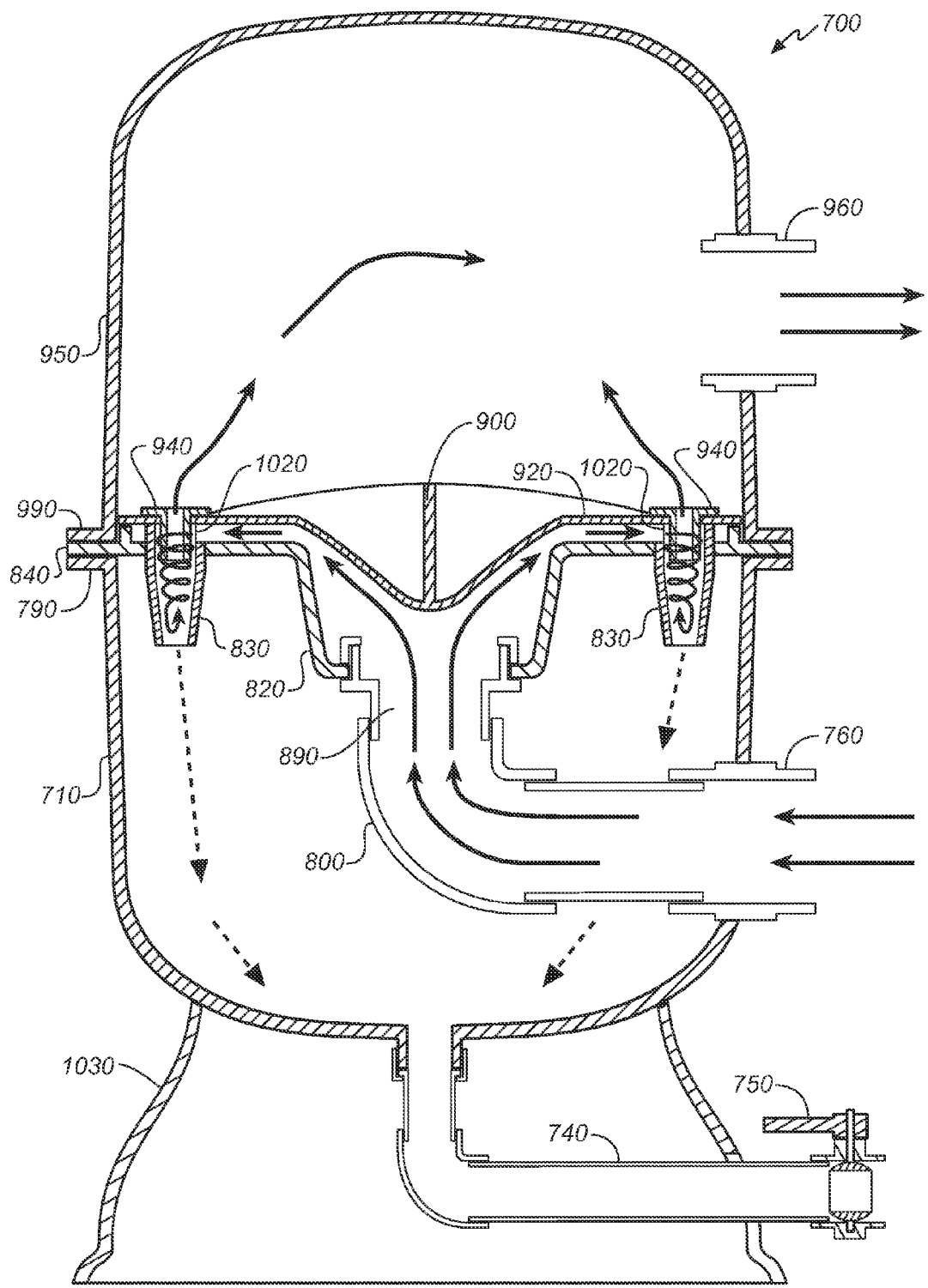
FIG. 7 is a diagrammatic cross-sectional side view in elevation of the fluid flow path through the second preferred embodiment.

Referring now to FIGS. 5-7, there is shown a second preferred embodiment of the multi-cyclone sediment filter of the present invention. In a second preferred embodiment, generally denominated 700, the cyclone separator or sediment filter comprises a lower housing member, shell, which functions as the sediment bowl 710. It includes a bottom portion 720, or sump, shaped to allow sediment particles to settle into its lowest drainage area 730, which is in fluid communication with a drain outlet pipe 740 having a two-way purge valve 750 for selective drainage of the sediment bowl 710. A fluid inlet 760 is also disposed in the lower shell. The fluid inlet includes fittings 770 for coupling to a pipe from a pressurized fluid source.

In the second preferred embodiment, the need for a particle bed is eliminated, as the drain outlet can accommodate both fine and course sediment. The need for drainage and/or purging can be determined by looking through a sight glass 780 disposed in the side of the lower shell, which enables a user to determine the amount of sediment that has accumulated in the lower shell. As in the first preferred embodiment, the upper edge of the sediment bowl includes an outwardly extending flange or rim 790.

The fluid inlet is coupled to an el 800 or otherwise bends and thereafter extends upwardly through the central portion 810 of the cyclone holder 820, which comprises a generally planar plate having a plurality of holes for receiving selectively removable fluid cyclones 830. An outer rim 840 of the cyclone holder is sized to match that of the flange 790 on lower shell 710, and one or the other of the underside of the cyclone holder or the top side of the flange is provided with an annular channel 850 for accommodating an annular O-ring 860 so as to provide a generally watertight seal. The upper side of the cyclone holder also includes an annular channel 870 for accommodating an O-ring 880. The fluid inlet terminates in an inlet opening 890 immediately under a diverter cone 900 attached to or integrally formed in the underside 910 of a manifold plate 920. The manifold plate is functionally equivalent to that employed in the first preferred embodiment, but includes a plurality of holes 930 for accommodating selectively removable diffuser tubes 940. Alternatively, the diffuser tubes may be integrally formed in the manifold plate, but in either case when the apparatus is assembled, they include lower ends that insert into the fluid cyclones, precisely as described above, each vertically disposed in an inverted conical orientation and including open upper and lower ends, the latter having the smaller openings.

Disposed over the diffuser plate is an upper shell or cap 950 having a fluid outlet 960 disposed through a side or the top and includes fittings 970 adapted for attachment to a fluid outlet pipe 980. The upper shell includes a flange portion 990 dimensionally matched to flange 790 and cyclone holder rim 840. The upper shell and lower shell comprise the filter housing, and the upper shell, lower shell, and cyclone holder are secured to one another using bolts or other fasteners through aligned apertures or other structural elements known in the art. Again, the upper shell creates the open space through which fluid flows after leaving the fluid cyclones and before exiting the filter through the fluid outlet 960. A air relief valve 1000 and a pressure gauge 1010 may be provided to maintain safe and optimal operating conditions.

Reference now is made to FIG. 7, which is a highly schematic (diagrammatic) cross-sectional view of the second preferred embodiment, showing certain structural features in an orientation slightly different from that shown in FIGS. 5 and 6. As can be seen by reference to FIG. 7, when the apparatus 700 is assembled, the manifold plate 920 is disposed within the housing interior defined by the upper and lower shells, 710 and 950, respectively, and over the cyclone holder 820 so as to create a kind of ceiling over the cyclone holder, thereby restricting fluid flow from the inlet opening 890. The fluid flowing into the filter through the inlet opening 890 is directed into the diverter cone 900, which spreads the fluid outwardly across the underside of the manifold plate and the top side of the cyclone holder, thereby directing fluid into the upper (vortex) openings 1020 in the fluid cyclones 830, where the sediment separation takes place during system operation. As will be appreciated, the fluid cyclones in this embodiment include the vortex openings, channels, and ports, as in the first preferred embodiment, such that water entering the fluid cyclones is induced into a swirling, vortex motion. After swirling in the fluid cyclone and separating from any sediment present, the water exits upwardly through the diffuser tubes 940 and then out fluid outlet 960.

The inventive apparatus embodiment in this second design is particularly well suited for smaller applications and therefore preferably includes a support base 1030.

From the foregoing it is clear that in its most essential aspect, the inventive multi-cyclone sediment filter comprises a lower shell for collecting sediment, an upper shell disposed above and connected to said lower shell so as to define a filter housing having an interior space for fluid flow, a cyclone holder disposed in said filter housing, said cyclone holder including a plurality of conically shaped fluid cyclones, each having a small opening at a lower end and larger opening at an upper end, a fluid inlet disposed in said filter housing for introducing water or oil into said filter housing and for passage into said plurality of fluid cyclones, a fluid outlet in fluid communication with said filter housing for discharging water or oil from said filter housing; and a manifold plate disposed above said cyclone holder, said manifold plate including a plurality of diffuser tubes, each of which extends downwardly into an opening at the upper end of one of said fluid cyclones in said plurality of fluid cyclones, and a diverter cone for directing water or oil into said fluid cyclones. Fluid flowing from said fluid inlet is directed into said diverter cone and is thereby directed outwardly between said manifold plate and said cyclone holder, into said fluid cyclones where sediment separation takes place, outwardly through said diffuser tubes, and then through said fluid outlet. The lower portion of the lower shell (i.e., the sediment bowl) collects sediment, which can be selectively discharged or purged using a drain outlet and purge valve assembly.

The foregoing disclosure is sufficient to enable those with skill in the relevant art to practice the invention without undue experimentation. The disclosure further provides the best mode of practicing the invention now contemplated by the inventor.

While the particular fluid filtering apparatus shown and disclosed in detail is fully capable of attaining the objects and providing the advantages stated herein, it is to be understood that it is merely illustrative of the presently preferred embodiment of the invention and that no limitations are intended to the detail of construction or design herein shown other than as defined in the appended claims. It will be appreciated, for instance, that the fluid inlet path need not come from directly underneath the sediment bowl. Indeed, any of a number of fluid inlet paths could be employed, as long as the fluid is delivered into the cyclone housing and cyclone cartridge in such a way as to ensure distribution through cartridge into the multiple cyclones. Thus, the fluid inlet tube may be disposed through the side of the lower shell or sediment bowl, or the side of the cyclone housing (in the case of the first preferred embodiment), the top or side of the upper shell, and so forth. The same is true of the fluid outlet. While it is economical to position the fluid outlet proximate the upper portions of the diffuser tubes, nothing prevents channeling or piping fluid downwardly through the housing for egress from a lower portion of the apparatus, for instance in the lower shell. Indeed, the fluid inlet may be disposed above both the manifold plate and the diverter plate, and the diverter cone located atop the cyclone holder rather than on the underside of the manifold plate. The only imperative is that fluid be introduced between the manifold plate and cyclone holder and then diverted across the cyclone holder so as to distribute it to and among the fluid cyclones for separation from sediment. Fluid so channeled will discharge upwardly through the diffuser tubes, and it may then be discharged from any portion of the apparatus desirable for the intended application and installation.

Further, it will be appreciated that alternative attachment means could be employed for securing the structural elements in the stacked configuration described and illustrated. For instance, rather than using a plurality of bolts passing through similarly sized flanges, additional threaded locking collars, clamps, or latches could be employed. While this would not be the most elegant arrangement of structures in a small filter adapted for use in swimming pool filtering, larger filters might employ such means advantageously.

Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A multi-cyclone sediment filter for filtering water and oil, comprising:
    a lower shell for collecting sediment;
    an upper shell disposed above and connected to said lower shell to create a filter housing, said upper shell including a fluid outlet;
    a cyclone holder disposed in said filter housing, said cyclone holder including a plurality of conically shaped fluid cyclones, each having a small opening at a lower end and larger opening at an upper end, and further including a plurality of fluid flow paths to said plurality of fluid cyclones;
    a fluid inlet disposed in said filter housing for introducing water or oil into said filter housing and for passage through said plurality of fluid cyclones;
    a fluid outlet in fluid communication with said filter housing for discharging water or oil from said filter housing; and
    a manifold plate disposed above said cyclone holder, said manifold plate including a plurality of diffuser tubes, each of which extends downwardly into an opening at the upper end of one of said fluid cyclones in said plurality of fluid cyclones, and a diverter cone for directing water or oil into said fluid cyclones.

2. The multi-cyclone sediment filter of claim 1, wherein said lower shell includes a sump portion for the collection of sediment separated from water or oil passing through said multi-cyclone sediment filter.

3. The multi-cyclone sediment filter of claim 1, further including a sediment bowl drain disposed in the bottom of said lower shell and having a purge valve for selective draining of sediment from said lower shell.

4. The multi-cyclone sediment filter of claim 1, further including a fluid conduit in fluid communication with said fluid inlet, and wherein said plurality of conically shaped fluid cyclones are vertically disposed and inverted in said cyclone holder, said cyclone holder further including a central portion having a fluid inlet opening, and wherein each of said fluid flow paths in said plurality of fluid flow paths in said multi-cyclone sediment filter includes a vortex opening, a vortex channel, and a vortex port, each in fluid communication with the open upper ends of one of said fluid cyclones in said plurality of fluid cyclones.

5. The multi-cyclone sediment filter of claim 1, wherein said diffuser tubes have an outer diameter at their lower ends which is less than that of the diameter of the openings in the upper ends of each of said fluid cyclones.

6. The multi-cyclone sediment filter of claim 5, wherein each of said diffuser tubes includes a through hole penetrating said diffuser plate and bringing said fluid cyclones into fluid communication with a space above said manifold plate.

7. The multi-cyclone sediment filter of claim 6, wherein said manifold plate is substantially circular and planar, and said diverter cone is disposed generally in the center of the underside of said manifold plate.

8. The multi-cyclone sediment filter of claim 1, wherein there is a space between said manifold plate and said upper shell.

9. The multi-cyclone sediment filter of claim 8, wherein said fluid outlet is in fluid communication with the space between said upper shell and said manifold plate.

10. A multi-cyclone sediment filter for filtering water and oil, comprising:
    a lower shell for collecting sediment;
    an upper shell disposed above and connected to said lower shell so as to define a filter housing having an interior space for fluid flow;
    a cyclone holder disposed in said filter housing, said cyclone holder including a plurality of conically shaped fluid cyclones, each having a small opening at a lower end and larger opening at an upper end;
    a fluid inlet disposed in said filter housing for introducing water or oil into said filter housing and for passage into said plurality of fluid cyclones;
    a fluid outlet in fluid communication with said filter housing for discharging water or oil from said filter housing;
    a manifold plate disposed above said cyclone holder, said manifold plate including a plurality of diffuser tubes, each of which extends downwardly into an opening at the upper end of one of said fluid cyclones in said plurality of fluid cyclones; and
    diverter structure disposed on said manifold plate for directing water or oil into said fluid cyclones;
    wherein fluid flowing from said fluid inlet is directed into said diverter cone and is thereby diverted into said fluid cyclones where sediment separation takes place, outwardly through said diffuser tubes, and then through said fluid outlet.

11. The multi-cyclone sediment filter for filtering water and oil of claim 10, wherein said fluid inlet directs fluid into a space between said cyclone holder and said manifold plate.

12. The multi-cyclone sediment filter for filtering water and oil of claim 11, wherein said diverter structure is a diverter cone disposed between said cyclone holder and said manifold plate.

13. The multi-cyclone sediment filter for filtering water and oil of claim 12, wherein said cyclone holder and said manifold plate are each substantially planar and said manifold plate includes an underside.

14. The multi-cyclone sediment filter for filtering water and oil of claim 13, wherein diverter cone is disposed on said underside of said manifold plate.

15. The multi-cyclone sediment filter for filtering water and oil of claim 14, wherein said diverter cone is integrally formed in said underside of said manifold plate.

16. The multi-cyclone sediment filter for filtering water and oil of claim 14, wherein said diverter cone is attached to said underside of said manifold plate.

17. The multi-cyclone sediment filter for filtering water and oil of claim 10, further including a sight glass disposed in a lower portion of said lower shell for visually determining the level of sediment that has accumulated in said lower shell.

18. The multi-cyclone sediment filter for filtering water and oil of claim 10, further including a discharge outlet for purging said multi-cyclone sediment filter.

19. The multi-cyclone sediment filter for filtering water and oil of claim 10, wherein said fluid inlet outlet and said fluid inlet are each disposed in one or the other of said lower shell and said upper shell, but not in the same shell.

20. The multi-cyclone sediment filter for filtering water and oil of claim 19, wherein said fluid inlet is disposed in said lower shell and said fluid outlet is disposed in said upper shell.

* * * * *